United States Patent
Rune et al.

(10) Patent No.: US 6,330,444 B1
(45) Date of Patent: Dec. 11, 2001

(54) PRE-PAGE TIMER

(75) Inventors: Johan Rune, Lindingö (SE); Yun Chao Hu, Yokohama (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/192,922

(22) Filed: Nov. 16, 1998

(51) Int. Cl.[7] .................................................. H04Q 7/20
(52) U.S. Cl. ......................... 455/433; 455/432; 455/458
(58) Field of Search .................................. 455/433, 432, 455/458, 435, 445, 456, 461

(56) References Cited

U.S. PATENT DOCUMENTS

| 5,353,332 | | 10/1994 | Raith et al. . | |
|---|---|---|---|---|
| 5,369,684 | * | 11/1994 | Buhl et al. ............................ | 455/432 |
| 5,400,390 | * | 3/1995 | Salin .................................... | 455/433 |
| 5,583,916 | * | 12/1996 | Maenpaa ............................. | 455/433 |
| 5,711,006 | * | 1/1998 | Brochu et al. ...................... | 455/445 |
| 5,946,619 | * | 8/1999 | Kolev ................................... | 45/432 |
| 6,108,518 | * | 8/2000 | Madour et al. .................... | 455/31.2 |
| 6,119,012 | * | 9/2000 | Amirijoo ............................. | 455/456 |
| 6,181,934 | * | 1/2001 | Havinis et al. ...................... | 455/432 |

FOREIGN PATENT DOCUMENTS 0 454 647   10/1991   (EP) .
92/13428    8/1992    (WO) .

OTHER PUBLICATIONS

GSM Technical Specification 02.79, "Digital cellular telecommunications system Phase 2+", European Telecommunications Standards Institute, Nov., 1996, pp. 1–17.

GSM Technical Specification 03.79, "Digital cellular telecommunications system Phase 2+", European Telecommunications Standards Institute, 1998, pp. 1–37.

* cited by examiner

*Primary Examiner*—Dwayne Bost
*Assistant Examiner*—Erika A. Gary
(74) *Attorney, Agent, or Firm*—Burns, Doane, Swecker & Mathis, L.L.P.

(57) ABSTRACT

Response-timer problems due to optional features in communication networks are addressed by having a node such as an MSC/VLR that uses the optional feature promptly respond to another node's request for information with a message indicating that the node has implemented the optional feature. This indication can be implemented either as a new message or as a suitable information element in a message already usually sent from one node to the other. Upon receiving such a prompt response, the node would adjust its response-monitoring timer to a value appropriate for the optional feature. Nodes in the communication network may also generate messages indicating that they implement the optional feature.

4 Claims, 5 Drawing Sheets

PRE-PAGE TIMER

BACKGROUND

The Global System for Mobile communication (GSM) is a radio communication system used by public land mobile networks (PLMNs) in many countries. The system is defined by a GSM standard that ensures uniformity and interoperability so that a user can access a GSM-compliant system anywhere in the world with minimal equipment compatibility problems. In addition to details such as modulation, frame formats, etc., the GSM standard specifies other activities that can be performed in the system. Many activities are associated with each particular subscriber, including call-related events such as call set-up and call termination. Other types of subscriber activities include invocation of call-related and call-independent supplementary services such as call hold, call waiting, call transfer, and call forwarding. Based on roaming agreements between different mobile network operators, a mobile subscriber belonging to a specific (home) PLMN (HPLMN) can use subscribed services and facilities while visiting (roaming in) other PLMNs (VPLMNs).

A network architecture typical of GSM systems is illustrated by FIG. 1, which shows an HPLMN 101 and VPLMNs 103, 105. In the HPLMN 101, a home location register (HLR) 115 stores data relating to subscribers to that PLMN, including, for example, current location of the subscriber equipment, directory number (MSISDN), radio number plan identification (e.g., international mobile subscriber identity (IMSD)), supplementary service profiles and teleservice profiles. A mobile switching center (MSC) and visitor location register (VLR) 120 manage connections and data associated with subscribers who are currently situated within their area of responsibility, e.g., those subscribers to other PLMNs, such as the HPLMN 101, who are roaming in their service area in the VPLMN 103 and their own subscribers belonging to the network operator that controls the VPLMN 103. Although actually different nodes, the MSC and VLR are almost always co-located; thus, they are usually referred to as one MSC/VLR.

An authentication center (AUC) 125 works in close association with the HLR 115, providing information for authenticating all communication sessions in order to guard against possible fraud, stolen subscriber cards, and unpaid bills. When a subscriber terminal 130, such as a mobile telephone, that is a subscriber to the HPLMN 101 contacts a base station (BS) 135 and tries to register their presence while visiting PLMN 103, the MSC/VLR 120 requests information from the HLR 115 in order to determine whether the terminal 130 is authorized to use the subscribed services and facilities within VPLMN 103. The information is requested by the HLR 115 and stored therein, and the HLR 115 transmits the information to the MSC/VLR 120 in response to a request from the MSC/VLR 120, e.g., during location updating. The MSC/VLR 120 transmits some of the information to the terminal 130, which determines a response that it sends to the MSC/VLR 120. Based on the response and the information, the MSC/VLR 120 determines whether the terminal 130 is authorized, and the HLR 115 updates its database to indicate that the terminal 130 is located in the area served by the MSC/VLR 120.

When the terminal 130 moves from the VPLMN 103 to the VPLMN 105, the terminal 130 recognizes the change and sends a location updating message to the new MSC/VLR (not shown) in the PLMN 105. The new MSC/VLR informs the HLR 115 of the new location of the terminal 130, and the HLR 115 sends a cancel-location message to the previously visited MSC/VLR 120 of the VPLMN 103 to indicate that the terminal 130 is no longer present in the area served by VPLMN 103. The HLR 115 sends an insert-subscriber-data (ISD) message to the new MSC/VLR of the VPLMN 105, providing the new MSC/VLR with the relevant subscriber data.

This architecture supports simultaneous activities in different MSC/VLRs in case of subscriber movement. In addition, activities on different gateway mobile switching centers (GMSCs) may be maintained simultaneously in various service scenarios. Typically, each PLNM has a GMSC, as indicated by GMSCs 140, 145 in FIG. 1. One scenario in which there are simultaneous subscriber activities is optimal routing, a network feature that enables calls to or attempts to initiate communication sessions with a subscriber to be routed directly to the subscriber's actual location or to the subscriber's forwarded-to destination. Without optimal routing, calls are routed via the HPLMN or, in the case of late call forwarding, via the VPLMN. In an exemplary optimal routing scenario, an HLR may receive send-routing-information (SRI) messages from other GMSCs that do not belong to the HPLMN network operator. An interrogating PLMN, which is the PLMN associated with an interrogating GMSC in an optimal routing scenario, interrogates the BPLMN of the called subscriber to determine the subscriber's location. The interested reader may refer to the GSM Technical Specifications (GTS) 02.79 and 03.79 for more details of the optimal routing feature.

Digital cellular communication systems such as those in accordance with the GSM standard have expanded functionality for optimizing system capacity and supporting hierarchical cell structures, i.e., structures of macrocells, microcells, picocells, etc. The term "macrocell" generally refers to a cell having a size comparable to the sizes of cells in a conventional cellular telephone system (e.g., a radius of at least about 1 kilometer), and the terms "microcell" and "picocell" generally refer to progressively smaller cells. For example, a microcell might cover a public indoor or outdoor area, e.g., a convention center or a busy street, and a picocell might cover an office corridor or a floor of a high-rise building. From a radio coverage perspective, macrocells, microcells, and picocells may be distinct from one another or may overlap one another to handle different traffic patterns or radio environments.

FIG. 2 illustrates an exemplary hierarchical, or multi-layered, cellular communication system that may be included in a PLMN. An umbrella macrocell 10 represented by a hexagonal shape makes up an overlying cellular structure. Each umbrella cell may contain an underlying microcell structure. The umbrella cell 10 includes microcell 20 represented by the area enclosed within the dotted line and microcell 30 represented by the area enclosed within the dashed line corresponding to areas along city streets, and picocells 40, 50, and 60, which cover individual floors of a building. The intersection of the two city streets covered by the microcells 20 and 30 may be an area of dense traffic concentration, and thus might represent a hot spot.

FIG. 3 is a block diagram of the exemplary cellular communication system, including an exemplary mobile station (MS) 130 and base station (BS) 135. The BS 135 includes a control and processing unit 150 which is connected through a base station controller (not shown) to an MSC/VLR 120 which in turn is connected to the public switched telephone network (PSTN) 155 (shown in FIG. 1). General aspects of such cellular radiotelephone systems are known in the art. The BS 135 handles a plurality of voice and data channels through a channel transceiver 160, which is controlled by the control and processing unit 150. Also, each BS includes a control channel transceiver 165, which may be capable of handling more than one control channel. The control channel transceiver 165 is controlled by the control and processing unit 150. The control channel transceiver 165 broadcasts control information over a control channel of the BS or cell to MSs locked to that control channel. It will be understood that the transceivers 160, 165 can be implemented as a single device, like the voice and control transceiver 170, for use with control and traffic channels that share the same radio carrier.

The MS 130 receives the information broadcast on a control channel at its voice and control channel transceiver 170. Then, the processing unit 180 evaluates the received control channel information, which includes the characteristics of cells that are candidates for the MS to lock on to, and determines on which cell the MS should lock. Advantageously, the received control channel information not only includes absolute information concerning the cell with which it is associated, but also contains relative information concerning other cells proximate to the cell with which the control channel is associated, as described for example in U.S. Pat. No. 5,353,332 to Raith et al., entitled "Method and Apparatus for Communication Control in a Radiotelephone System".

In North America, a digital cellular radiotelephone system using time division multiple access (TDMA) is called the digital advanced mobile phone service (D-AMPS), some of the characteristics of which are specified in the TIA/EIA/IS-136 standard published by the Telecommunications Industry Association and Electronic Industries Association (TIA/EIA). Another digital communication system using direct sequence code division multiple access (DS-CDMA) is specified by the TIA/EIA/IS-95 standard, and a frequency hopping CDMA communication system is specified by the EIA SP 3389 standard (PCS 1900). The PCS 1900 standard is an implementation of the GSM system.

Several proposals for the next generation of digital cellular communication systems are currently under discussion in various standards setting organizations, which include the International Telecommunications Union (ITU), the European Telecommunications Standards Institute (ETSI), the Telecommunications Industry Association (TIA), and Japan's Association of Radio Industries and Businesses (ARIB) and Telecommunications Technology Council (TTC). Besides transmitting voice information, the next generation systems can be expected to carry packet data and to inter-operate with packet data networks that are also usually designed and based on industry-wide data standards such as the open system interface (OSI) model or the transmission control protocol/Internet protocol (TCP/IP) stack. These standards have been developed, whether formally or de facto, for many years, and the applications that use these protocols are readily available. The main objective of standards-based networks is to achieve interconnectivity with other networks (e.g., circuit-switched and packet-switched networks). The Internet is today's most obvious example of such a standards-based packet data network in pursuit of this goal.

In most of these digital communication systems, communication channels are implemented by frequency modulating radio carrier signals, which have frequencies near 800 megahertz (MHz), 900 MHz, 1800 MHz, and 1900 MHz. In TDMA systems and even to varying extents in CDMA systems, each radio channel is divided into a series of time slots, each of which contains a block of information from a user. The time slots are grouped into successive frames that each have a predetermined duration, and successive frames may be grouped into a succession of what are usually called superframes. The kind of access technique (e.g., TDMA or CDMA) used by a communication system affects how user information is represented in the slots and frames, but current access techniques all use a slot/frame structure.

Time slots assigned to the same user, which may not be consecutive time slots on the radio carrier, may be considered a logical channel assigned to the user. During each time slot, a predetermined number of digital bits are transmitted according to the particular access technique (e.g., CDMA) used by the system. In addition to logical channels for voice or data traffic, cellular radio communication systems also provide logical channels for control messages, such as paging/access channels for call-setup messages exchanged by BSs and MSs and synchronization channels for broadcast messages used by MSs and other remote terminals for synchronizing their transceivers to the frame/slot/bit structures of the BSs. In general, the transmission bit rates of these different channels need not coincide and the lengths of the slots in the different channels need not be uniform. Moreover, next generation cellular communication systems being considered in Europe and Japan are asynchronous, meaning that the structure of one BS is not temporally related to the structure of another BS and that an MS does not know any of the structures in advance.

In the ongoing standardization of next generation systems, ETSI and ARIB/TTC are cooperating to achieve a single standard common for both regions, the universal mobile telephone system (UMTS). The UMTS is based on a new radio access interface and an evolved version of a GSM core network. In addition to co-operating with ETSI, ARIB/TTC are cooperating with TIA to achieve a single standard common for both regions, the International Mobile Telecommunication 2000 (IMT-2000) standard. The IMT-2000 standard is based on an evolved CDMAone (i.e., TIA/EIA/IS-95-A) radio access interface (CDMA2000) and an evolved version of an ANSI IS-41 core network.

One feature of UMTS/IMT-2000 that may be implemented is a page-before-routing, or pre-page, feature. The idea is that the MSC/VLR should initiate the paging of a subscriber terminal 150 when the MSC/VLR receives a request for a roaming number (e.g., an MSRN) from the HLR and that the roaming number should not be not sent to the HLR until a page response is received from the subscriber terminal, indicating that the terminal is actually reachable at the moment. In the current procedure in GSM, the MSC/VLR returns a roaming number promptly upon request by the HLR and paging is not initiated until the call is actually routed to the MSC/VLR based on the roaming number.

The pre-page procedure has at least one advantage. If the subscriber terminal does not respond to the page so the call cannot be completed (which can happen quite often), then no switching and transmission resources between the GMSC and the MSC/VLR are (uselessly) reserved, as would be the case with the conventional GSM procedure. Hence, the pre-page feature saves switching and transmission resources in the fixed network. It is currently believed that this is the main reason for the feature.

If the pre-page feature is simply an option in the evolved GSM core network, some PLMNs can be expected to implement it and others can be expected not to implement it. This introduces a timer problem in the GMSC and the HLR. Paging a subscriber terminal takes much longer time than just allocating a roaming number, maybe a couple of hundred times longer. As a result, the HLR will not know in advance how long to wait for a response to its request for a roaming number so the IHLR will not know how to set its response-monitoring timer appropriately. If the conventional-GSM short timer is used with an MSC/VLR using the pre-page feature, the HLR's timer will time out and the call may be incorrectly released. On the other hand, if a long timer is used with an MSC/VLR not using the pre-page feature, the HLR's timer will be far too long and call completion will be unnecessarily delayed. The same considerations apply to the GMSC in relation to its communication with the HLR. Therefore, the use of the pre-page feature has to be coordinated somehow between the involved 5 nodes/networks.

SUMMARY

An object of this invention is to address response-timer problems due to optional features in communication networks by having a node such as an MSC/VLR that uses the optional feature promptly respond to another node's request for information with a message indicating that the node has implemented the optional feature. This indication can be implemented either as a new message or as a suitable information element in a message already usually sent from one node to the other. Upon receiving such a prompt response, the node would adjust its response-monitoring timer to a value appropriate for the optional feature. Nodes in the communication network may also generate messages indicating that they implement the optional feature.

In one aspect of the invention, a method in a communication system includes the steps of promptly sending, from the MSC/VLR to the HLR in response to a request from the HLR for a roaming number for the subscriber terminal, a first message indicating that the MSC/VLR initiates paging of subscriber terminals upon receiving roaming number requests and sends roaming numbers to HLRs after receiving page responses from the subscriber terminals; and adjusting, if necessary, the timer in the HLR after receipt of a first message. The method further includes the steps of sending, from the HLR to the GMSC, a second message indicating that the MSC/VLR initiates paging of subscriber terminals upon receiving roaming number requests and sends roaming numbers to HLRs after receiving page responses from the subscriber terminals; and adjusting, if necessary, the timer in the GMSC after receipt of a second message.

In another aspect of the invention, a method in a communication system includes the steps of sending, from a GMSC to an HLR, a request for routing information that includes an indication whether the timer in the GMSC is adjustable based on whether the MSC/VLR initiates paging of subscriber terminals upon receiving roaming number requests and sends roaming numbers to HLRs after receiving page responses from the subscriber terminals; and sending, from the HLR to an MSC/VLR, a message indicating whether the timer in the HLR is adjustable based on whether the MSC/VLR initiates paging of subscriber terminals upon receiving roaming number requests and sends roaming numbers to HLRs after receiving page responses from the subscriber terminals.

In another aspect of the invention, a method in a communication system includes the steps of sending, from the MSC/VLR to the HLR, a request for location updating that includes an indication whether the MSC/VLR supports the initiation of paging a subscriber terminal upon receiving a roaming number request and the sending of a roaming number to an HLR after receiving a page response from the subscriber terminal; marking this indication in a profile of the subscriber terminal in the HLR; sending, from a GMSC that has a long non-adjustable timer to an HLR, a request for routing information; and sending, from the HLR to the MSC/VLR, a roaming number request including an acknowledgment of a location updating request that includes the "pre-page" indication received from the MSC/VLR.

In yet another aspect of the invention, a method in a communication system includes the steps of promptly sending, from the MSC/VLR to the HLR in response to a request from the HLR for a roaming number for the subscriber terminal, a first message indicating that the MSC/VLR initiates paging of subscriber terminals upon receiving roaming number requests and sends roaming numbers to HLRs after receiving page responses from the subscriber terminals; and adjusting, if necessary, the timer in the HLR after receipt of a first message. The method further includes the steps of sending, from the HLR to the GMSC, a second message indicating that the MSC/VLR initiates paging of subscriber terminals upon receiving roaming number requests and sends roaming numbers to HLRs after receiving page responses from the subscriber terminals; adjusting, if necessary, the timer in the GMSC after receipt of a second message; and sending, from the GMSC to the HLP, a request for routing information that includes an indication whether the timer in the GMSC is adjustable based on whether the MSC/VLR initiates paging of subscriber terminals upon receiving roaming number requests and sends roaming numbers to HLRs after receiving page responses from the subscriber terminals. The request from the HLR for a roaming number indicates at least one of whether the timer in the HLR and the timer in the GMSC is adjustable based on whether the MSC/VLR initiates paging of subscriber terminals upon receiving roaming number requests and sends roaming numbers to HLRs after receiving page responses from the subscriber terminals.

In a further aspect of the invention, a communication system includes at least one subscriber terminal, MSC/VLR, HLR including an adjustable timer, and GMSC including an adjustable timer, in which the timers in the HLR and GMSC adjust based on whether the MSC/VLR initiates paging of the subscriber terminal upon receiving a request for a roaming number from the HLR and the MSC/VLR sends the roaming number to the HLR after receiving a page response from the subscriber terminal.

In another aspect of the invention, a method in a communication system having a visited/serving network, a home network including an adjustable timer, and an interrogating network including an adjustable timer includes the step of adjusting the timers in the home network and interrogating network according to information received from a visited/serving network.

BRIEF DESCRIPTION OF THE DRAWINGS

Applicants' invention will be understood by reading this description in conjunction with the drawings, in which.

DETAILED DESCRIPTION

The possible timer problem in the GMSC and HLR that arises from an optional pre-page feature can be solved in a number of ways that are described in more detail below. Applicants' invention is described below in terms of GSM networks, but it should be understood that the invention is generally applicable to any situation in which an interrogating network and a home network (e.g., an HLR and GMSC) require information from a visited/serving network (e.g., and MSC/VLR) in order to adjust their timers optimally to procedures in the visited/serving network. Moreover, the networks need not be GSM networks.

Figure 1:
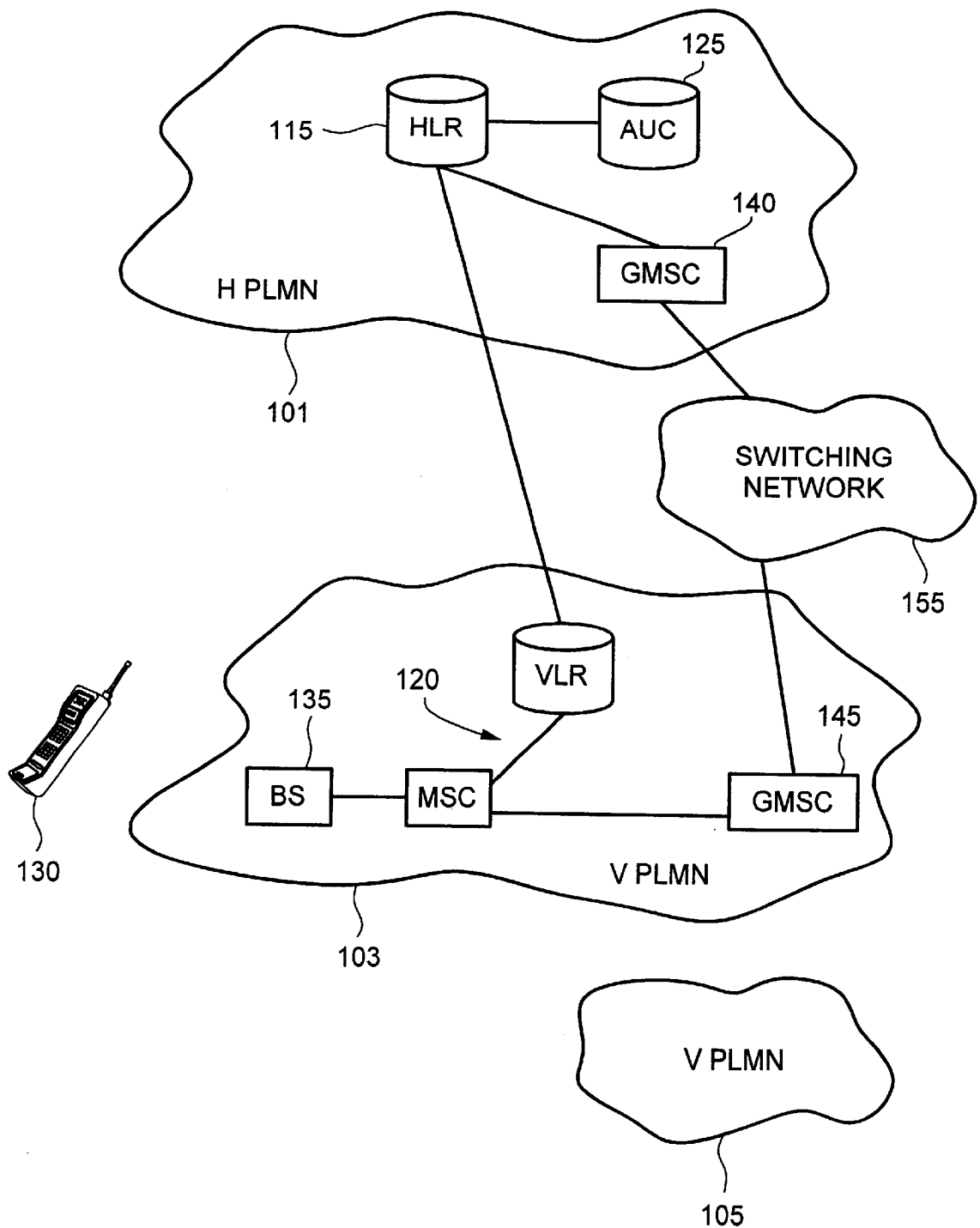
FIG. 1 illustrates the architecture of an exemplary GSM communication network.
Figure 2:
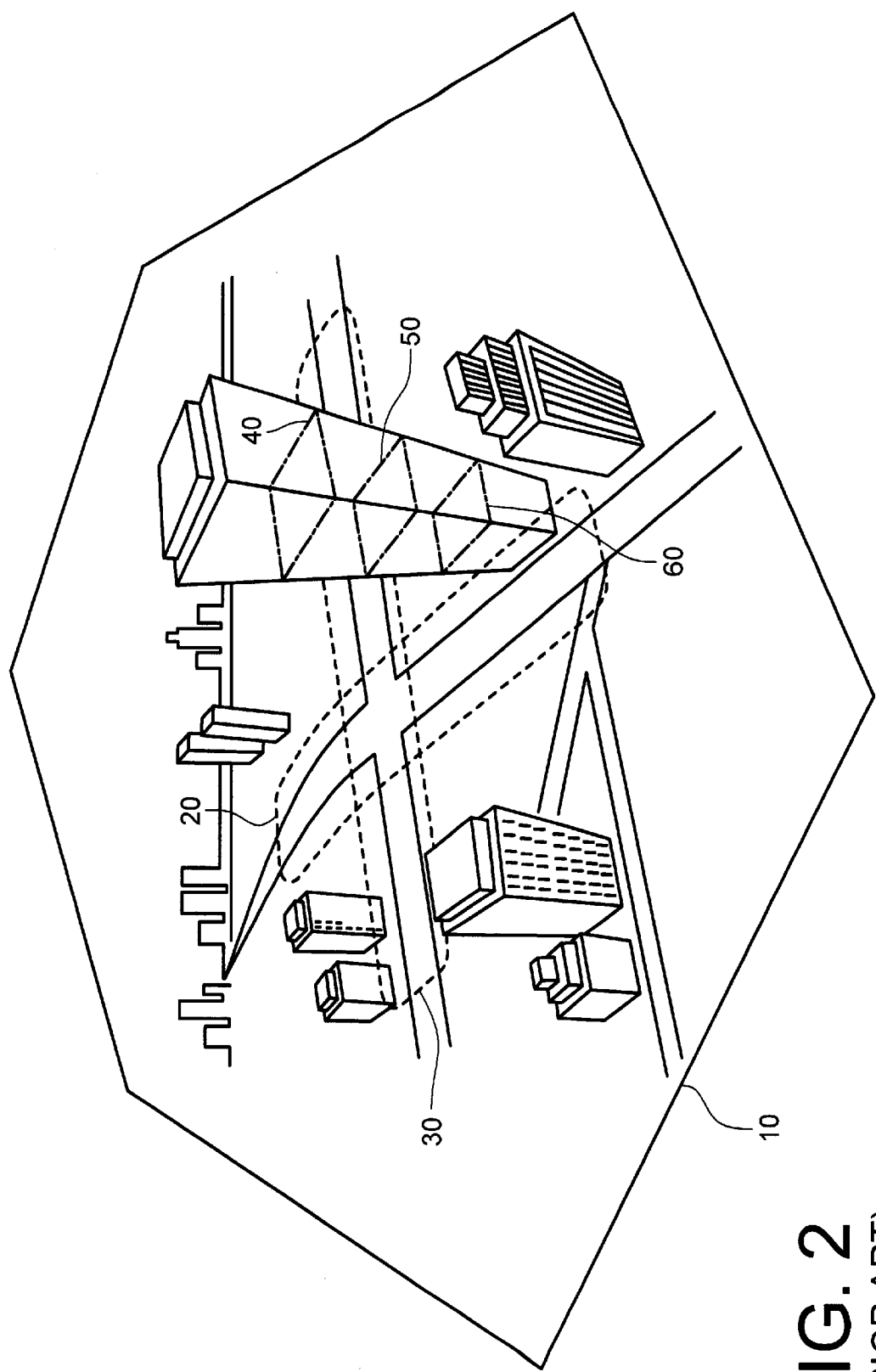
FIG. 2 illustrates an exemplary hierarchical, or multi-layered, cellular system.
Figure 3:
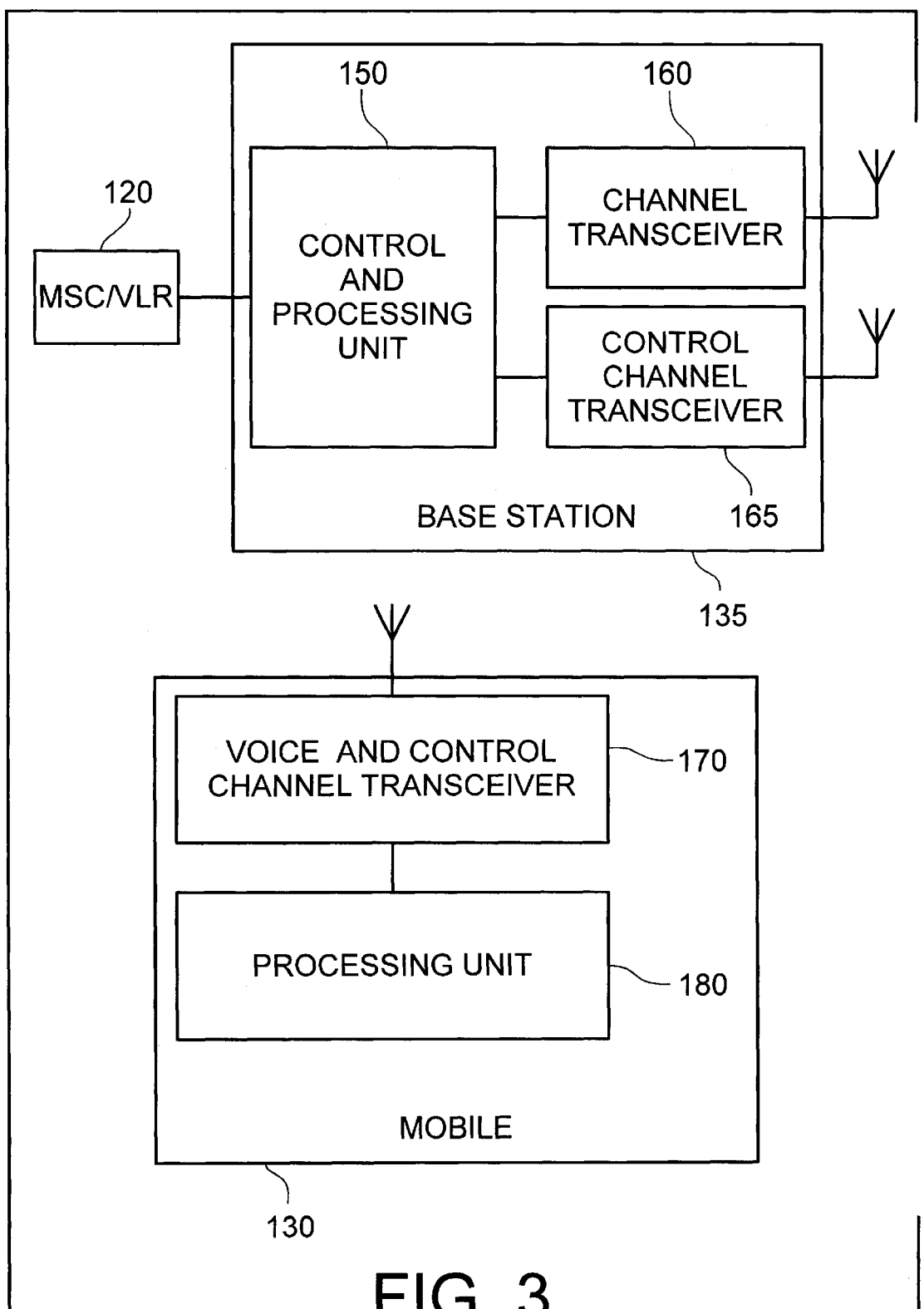
FIG. 3 is a block diagram of an exemplary cellular mobile radiotelephone system.
Figure 4:
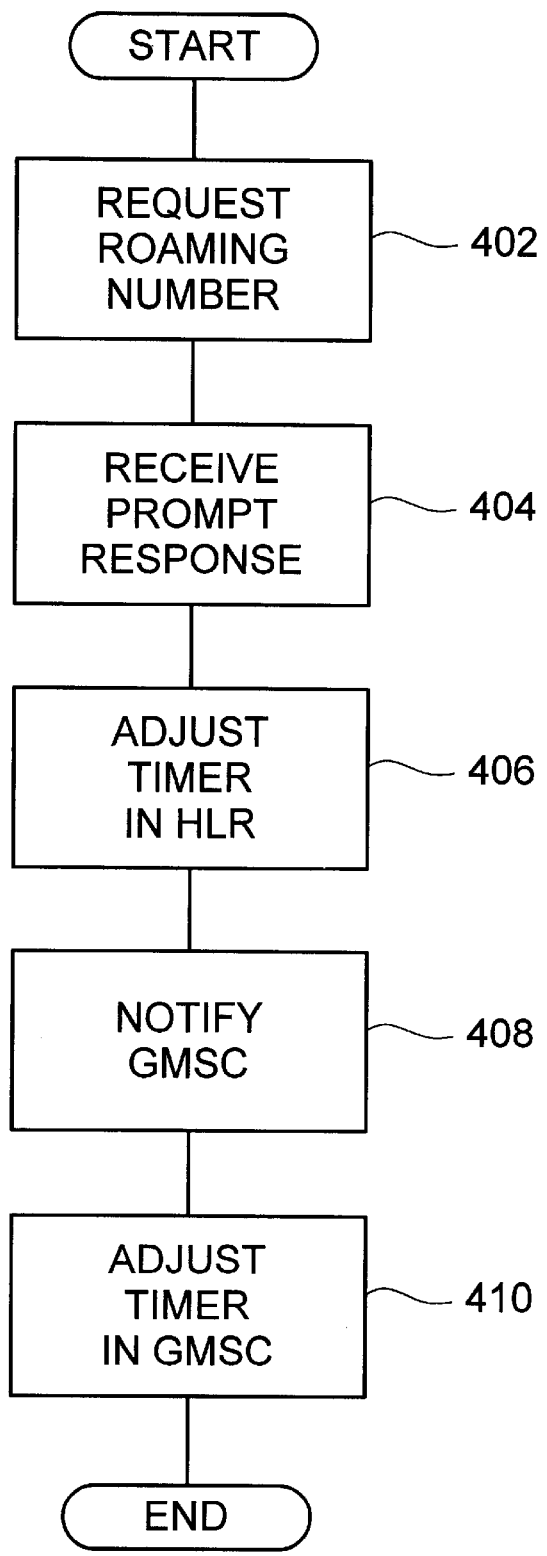
FIG. 4 is a flow chart of a method in accordance with the invention.

One method of solving the timer problem in accordance with the invention is illustrated in FIG. 4. The MSC/VLR that uses the pre-page feature would be configured such that the MSC/VLR promptly responds to an HLR's request for a roaming number (step 402) with a message indicating that the MSC/VLR has implemented the pre-page feature. This indication could be implemented either as a new message or as a suitable information element in a message already usually sent from the MSC/VLR to the HLR. After such a prompt response, the MSC/VLR would wait for a response from the terminal before sending the roaming number to the HLR in the conventional manner described in GSM MAP (GTS 09.02) specification. In this context, a "prompt" response is simply one that is received before the expiration of a time period allowed for the response governed by a conventional GSM short timer.

In response to a prompt pre-page notification from an MSC/VLR (step 404), the HLR adjusts its timer accordingly (step 406) and sends a comparable feature-notification message to the GMSC (step 408). In response to the notification, the GMSC in turn adjusts its timer (step 410). It will be understood that the particular format of these messages is not important, except to the extent that they would conform to the particular protocol used for messages sent from an MSC/VLR to an HLR and from an BLR to a GMSC.

In this method, the MSC/VLR (where the impact of the pre-page feature is likely to be largest by far) still has the option to implement the pre-page feature or not. Thus, the MSC/VLR does not have to be modified to generate feature-notification messages. The HLR and GMSC, however, must be able to receive and "understand" feature-notification messages to accommodate those MSCs/VLRs that choose to implement the pre-page feature, and the HLR and GMSC must also be able to adjust their timers accordingly.

An optional aspect of this method is to configure the HLR and GMSC such that they too indicate whether they support the pre-page feature, i.e., whether they have adjustable timers. The HLR could do this by a suitable information element in its request for a roaming number from the MSC/VLR, and the GMSC could do this by a suitable information element in its request for routing information from the HLR. Not providing an indication of support would be interpreted as an indication of no support.

With this optional aspect, the HLR and GMSC are also given the option to support the pre-page feature or not. If an HLR or GMSC supports the pre-page feature but an MSC/VLR does not, the system would fall back to the conventional MAP protocol when such an MSC/VLR receives an indication of pre-page support in a request for a roaming number.

It may be noted that a communication system employing this optional aspect as a stand alone solution (i.e., without support for the previously described feature notification in the MSC/VLR) can sometimes have its HLR and GMSC timers set to far too large values. This can happen when the HLR and GMSC indicate that they expect the pre-page feature and the MSC/VLR does not use the feature, but the MSC/VLR can handle messages from the HLR including such indications of feature support, i.e., when no fall-back to the conventional procedure is initiated.

Figure 5:
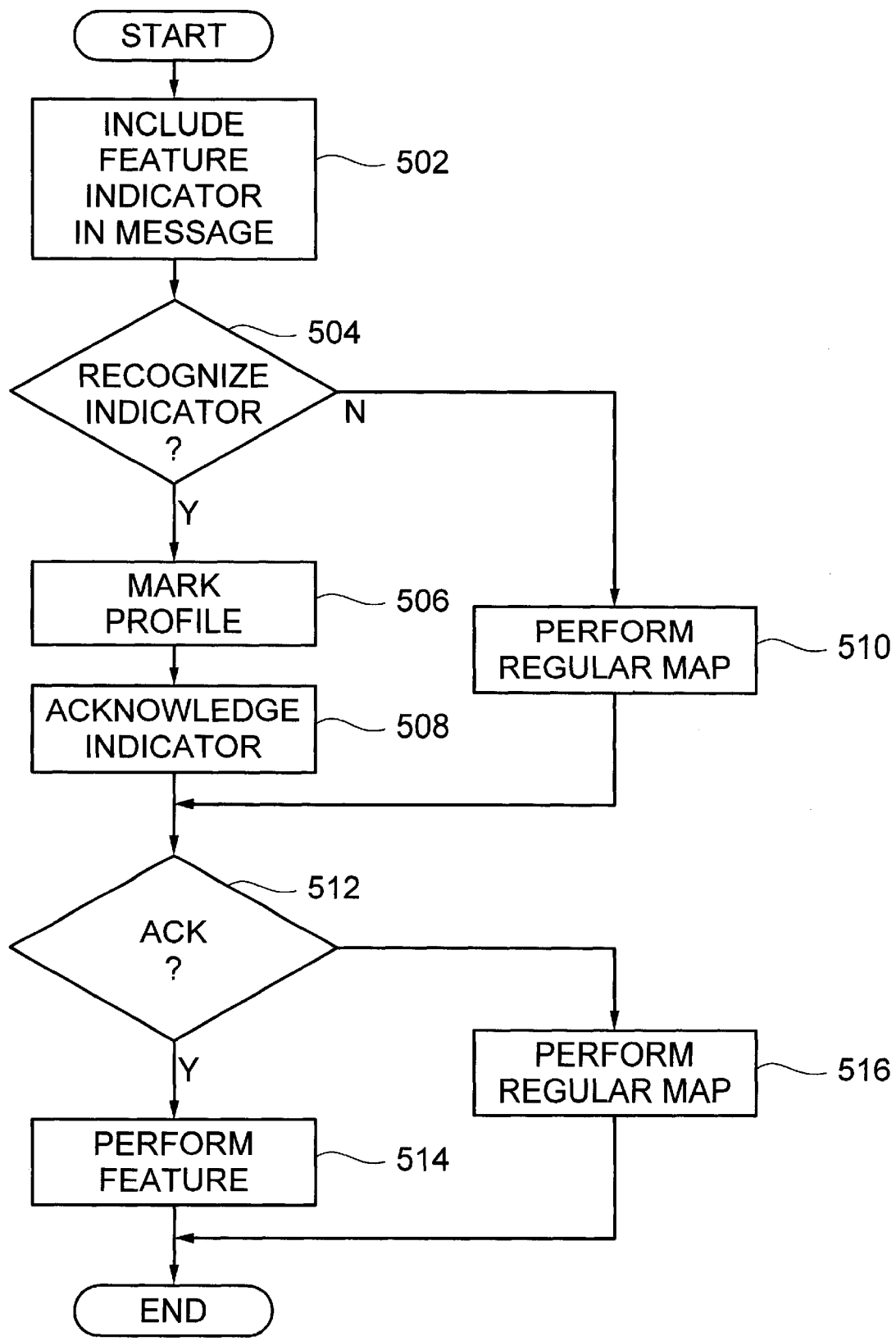
FIG. 5 is a flow chart of another method in accordance with the invention.

Another aspect of this invention that is illustrated in FIG. 5 is to configure the MSC/VLR such that it indicates whether it supports the pre-page feature, i.e., whether it has implemented the pre-page feature, within a message generated by the MSC/VLR, such as the location update message (step 502). If the HLR recognizes this indication (YES branch of step 504), the HLR marks this indication in the subscriber's profile (step 506). When the HLR requests a roaming number from the MSC/VLR, the roaming number request includes an acknowledgment by the HLR to the MSC/VLR of the previously received message having the pre-page feature indication (step 508). If the HLR does not recognize the received "pre-page" indicator from the MSC/VLR (NO branch of step 504), the HLR ignores the indicator and performs the conventional MAP procedures (step 510). The MSC/VLR checks for the acknowledgment in the HLR's request for a roaming number (step 512), and on a positive acknowledgment from the HLR, the MSC/VLR performs the pre-page feature (step 514). If the MSC/VLR receives an HLR's request for a roaming number without a positive acknowledgment or with a negative acknowledgment, the MSC/VLR performs the conventional MAP procedures (step 516). It will be understood that the timer in the GMSC shall be long enough to support the pre-page feature.

With this optional aspect, the HPLMN operator need not support any modifications in association with the pre-page feature. In other words, the pre-page feature can be considered as "transparent" for the HPLMN network. The interaction between the HLR and the GMSC is handled using the conventional MAP procedures.

It will be appreciated by those of ordinary skill in the art that this invention can be embodied in other specific forms without departing from its essential character. The embodiments described above should therefore be considered in all respects to be illustrative and not restrictive. The scope of Applicants' invention is determined by the following claims, and all modifications that fall within that scope are intended to be included therein.

What is claimed is:

1. A method in a communication system having at least one subscriber terminal, mobile switching center and visitor location register (MSC/VLR), home location register (HLR) including an adjustable timer, and gateway mobile switching center (GMSC) including an adjustable timer, the method comprising the steps of:

promptly sending, from the MSC/VLR to the HLR in response to a request from the HLR for a roaming number for the subscriber terminal, a first message indicating that the MSC/VLR initiates paging of subscriber terminals upon receiving roaming number requests and sends roaming numbers to HLRs after receiving page responses from the subscriber terminals;

adjusting, if necessary, the timer in the HLR after receipt of a first message;

sending, from the HLR to the GMSC, a second message indicating that the MSC/VLR initiates paging of subscriber terminals upon receiving roaming number requests and sends roaming numbers to HLRs after receiving page responses from the subscriber terminals; and adjusting, if necessary, the timer in the GMSC after receipt of a second message.

2. A method in a communication system having at least one subscriber terminal, mobile switching center and visitor location register (MSC/VLR), home location register (HLR) including an adjustable timer, and gateway mobile switching center (GMSC) including an adjustable timer, the method comprising the steps of:

sending, from a GMSC to an HLR, a request for routing information that includes an indication whether the timer in the GMSC is adjustable based on whether the MSC/VLR initiates paging of subscriber terminals upon receiving roaming number requests and sends roaming numbers to HLRs after receiving page responses from the subscriber terminals; and sending, from the HLR to an MSC/VLR, a message indicating whether the timer in the HLR is adjustable based on whether the MSC/VLR initiates paging of subscriber terminals upon receiving roaming number requests and sends roaming numbers to HLRs after receiving page responses from the subscriber terminals.

3. A method in a communication system having at least one subscriber terminal, mobile switching center and visitor location register (MSC/VLR), home location register (HLR) including an adjustable timer, and gateway mobile switching center (GMSC) including an adjustable timer, the method comprising the steps of:

promptly sending, from the MSC/VLR to the HLR in response to a request from the HLR for a roaming number for the subscriber terminal, a first message indicating that the MSC/VLR initiates paging of subscriber terminals upon receiving roaming number requests and sends roaming numbers to HLRs after receiving page responses from the subscriber terminals;

adjusting, if necessary, the timer in the HLR after receipt of a first message;

sending, from the HLR to the GMSC, a second message indicating that the MSC/VLR initiates paging of subscriber terminals upon receiving roaming number requests and sends roaming numbers to HLRs after receiving page responses from the subscriber terminals;

adjusting, if necessary, the timer in the GMSC after receipt of a second message; and sending, from the GMSC to the HLR, a request for routing information that includes an indication whether the timer in the GMSC is adjustable based on whether the MSC/VLR initiates paging of subscriber terminals upon receiving roaming number requests and sends roaming numbers to HLRs after receiving page responses from the subscriber terminals;

wherein the request from the HLR for a roaming number indicates at least one of whether the timer in the HLR and the timer in the GMSC is adjustable based on whether the MSC/VLR initiates paging of subscriber terminals upon receiving roaming number requests and sends roaming numbers to HLRs after receiving page responses from the subscriber terminals.

4. A communication system, comprising at least one subscriber terminal, mobile switching center and visitor location register (MSC/VLR), home location register (HLR) including an adjustable timer, and gateway mobile switching center (GMSC) including an adjustable timer, in which the timers in the HLR and GMSC adjust based on whether the MSC/VLR initiates paging of the subscriber terminal upon receiving a request for a roaming number from the HLR and the MSC/VLR sends the roaming number to the HLR after receiving a page response from the subscriber terminal.

* * * * *